United States Patent [19]

Baur

[11] 3,987,563
[45] Oct. 26, 1976

[54] EXCAVATOR
[75] Inventor: Anton Baur, Ehingen, Donau, Germany
[73] Assignee: Hans Boos, Lohhof, Germany
[22] Filed: Dec. 13, 1974
[21] Appl. No.: 532,564

[30] Foreign Application Priority Data
Dec. 15, 1973 Germany............................ 2362483

[52] U.S. Cl................................. 37/73; 37/118 R; 214/38 R; 212/145
[51] Int. Cl.² ...................... E02F 9/00; B66C 23/62
[58] Field of Search.......................... 37/118, 73, 71; 212/145; 214/131 A, 38 R, 38 CC

[56] References Cited
UNITED STATES PATENTS

| 3,298,539 | 1/1967 | Sundstrom | 212/145 |
| 3,307,829 | 3/1967 | Thwaites | 214/38 R X |
| 3,608,756 | 9/1971 | Guinot | 212/145 |
| 3,777,898 | 12/1973 | Gallay | 212/145 X |
| 3,777,919 | 12/1973 | Konijn | 37/73 X |
| 3,795,332 | 3/1974 | Eriksson | 214/131 A |
| 3,855,807 | 12/1974 | Grable | 37/71 |

Primary Examiner—Stephen C. Pellegrino
Attorney, Agent, or Firm—George R. Douglas, Jr., Anthony D. Cennamo

[57] ABSTRACT

An excavator comprises a basic frame carrying an independently operable excavator mechanism and being seatable on a transport vehicle, the basic frame being provided with at least three folding support legs.

20 Claims, 10 Drawing Figures

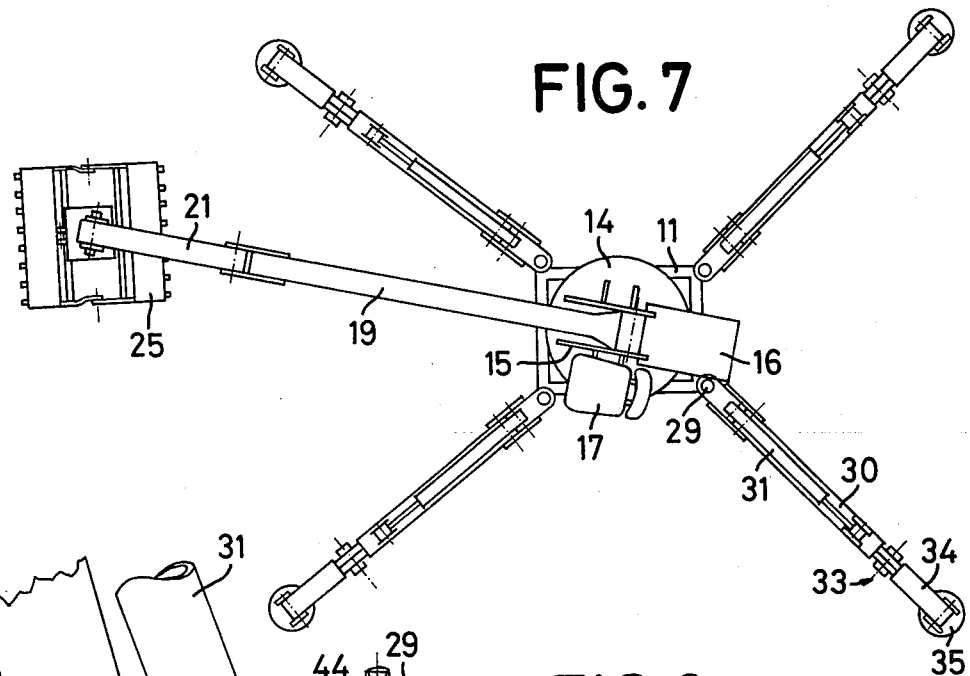
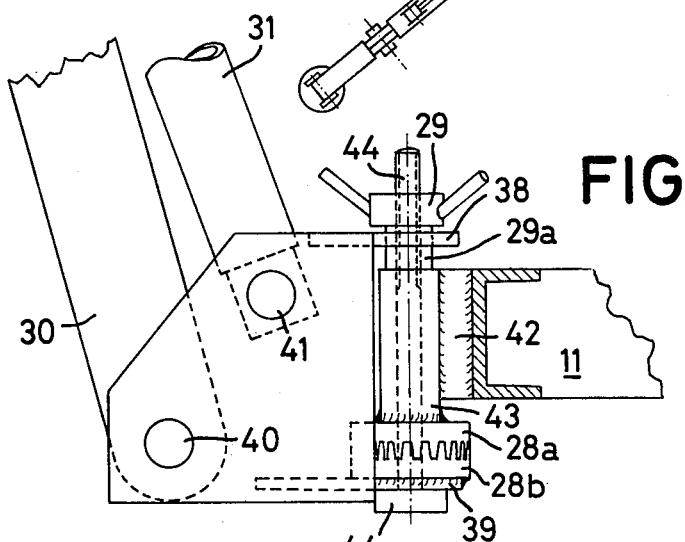
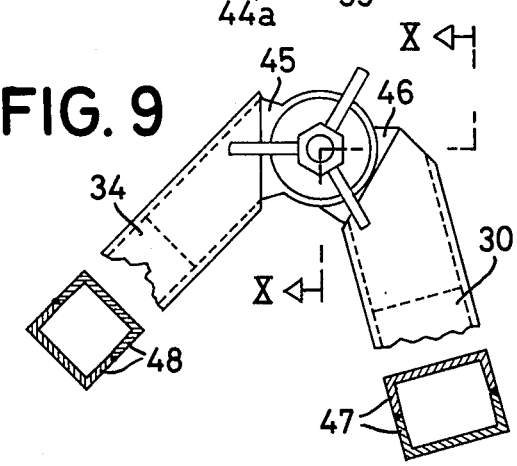
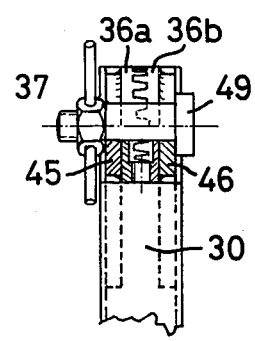

EXCAVATOR

BACKGROUND OF THE INVENTION

The invention relates to an excavator, such as a cemetery excavator, with a device for the releasable connection to a transport vehicle and with lateral supports which in each case are pivotable about a vertical axis and by means of a pressure cylinder are pivotable about a horizontal axis.

A known excavator which inter alia is also intended for digging graves, comprises a motor-driven compact four-wheeled vehicle, to the front end of which can be connected hydraulically actuable excavator equipment if required. This excavator equipment substantially comprises a turntable, an arm with gripping device, the hydraulic control devices and two supports which can be swung out hydraulically. Occasionally two further supports are provided at the opposite corners of the vehicle.

This excavator is, however, not capable of functioning without the vehicle. The vehicle is therefore connected to its setting up position during the excavating. In cemeteries it is often not possible to swing out the supports on the path surfaces so that damage to adjacent grave enclosures cannot be avoided. The known four-wheel vehicle carrying the excavator equipment is a special vehicle with an extraordinarily complicated wheel steering and brake-control system. Indeed it is suitable for the addition of different types of other hydraulically actuable working devices, but not as a pure transport vehicle. Thus the economics of the known excavator is restricted particularly in use by cemetery administrations.

SUMMARY OF THE INVENTION

It is an object of the invention to provide a simple excavator the behaviour of which is more economic, particularly for cemetery and local administration, and which is better suited for the restricted space conditions in cemeteries.

According to the invention there is provided an excavatir comprising a basic frame, an independently operable excavating mechanism on said basic frame, seating means on said basic frame for seating of said basic frame on a transport vehicle and at least three folding legs on said basic frame for supporting said basic frame.

BRIEF DESCRIPTION OF THE DRAWINGS

The invention will now be described in greater detail, by way of example, with reference to the drawings in which:

FIG. 7 shows a plan view of the excavator according to FIG. 4 in the working position;

FIG. 8 shows a side view of the joint connection between one leg and the carrying arm on a larger scale;

FIG. 9 shows a side view of the lockable joint between two limbs, and

FIG. 10 shows a part section of the joint according to FIG. 9 along the sectional view X-X.

DESCRIPTION OF THE PREFERRED EMBODIMENTS

Figure 1:
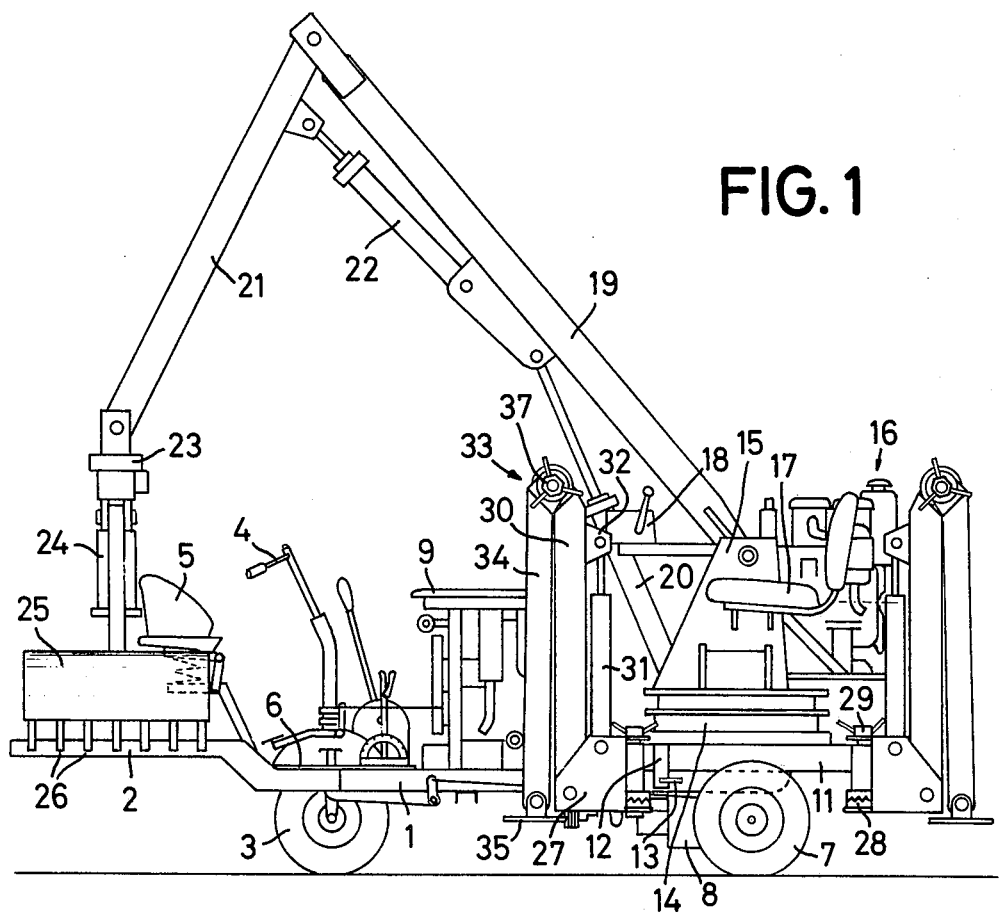
FIG. 1 shows a side view of the saddled-up, ready-to-drive excavator.

Basically, the invention proposes, starting from an excavator of the type described at the outset, that a horizontal basic frame carrying an independently operable excavating mechanism is provided, which basic frame can be placed on a transport vehicle from above and at which there are pivoted at least three supports and that at the end of each support, which is remote from the appropriate pivot point, is connected, by means of a lockable joint with horizontal axis, a further support element, whereby collapsible legs result.

Thus an excavator can be provided which is capable of standing on its legs and which has its own small motor for driving the hydraulic equipment and thus can be operated independently of the transport vehicle. For the propulsion of the excavator, conventional transport vehicles, particularly low three-wheeled vehicles, can be used, which are relatively low priced and are already in use in many cases with the prospective buyers for such excavators, particularly municipalities, cemetery administrations and funeral undertakings. For this reason, usually the prime costs are reduced to the costs of the pure excavator without vehicle. A simple small diesel motor without starter, battery and dynamo is sufficient to drive the hydraulic pressure generator. Insofar as removal of the excavated material is necessary, this transport can be carried out by the same vehicle which has brought up the excavator.

An important feature is the construction of the excavator supports which are not actually supports but legs on which the entire excavator weight rests. These legs comprise appropriately two limbs which are similar and have approximately the same length. The lockable joint is preferably so constructed that the limbs can be folded up in pairs so far that they lie paralellel to each other and are vertical in the transport position. For raising from the transport vehicle the inner limb is pivoted outwardly with the help of its pressure cylinder so far that it stands obliquely upward. At the same time the outer limb, which can be easily rotated in the released joint, is also pivoted outwardly by hand so that its free end stands on the ground at a spacing from the basic frame. In this angular position which is selectable according to the local conditions, the joints of the legs are locked and thereafter the pressure cylinder of the inner limb is extended further in the same direction. In this way the basic frame with the excavator is raised so that the transport vehicle can drive away underneath.

The loading or "saddling up" of the excavator is effected analogously in the reversed sequence. These operations are extraordinarily simple and can be carried out by one person. Since the excavator has its own drive unit, neither electrical or hydraulic connecting lines have to be separated or coupled.

The advantage of the legs, in accordance with the invention, however, consist not only in the fact that the excavator can raise or lower itself on loading. As compared with the known excavator supports, which extend horizontally or even at a very flat angle to the surface of the ground, the outer limb of the leg in accordance with the invention, the free end of which stands up on the ground, is rather steep. In this case it is advantageously possible to engage over obstacles, for example grave enclosures and to find with ease any suitable support point for the leg. Moreover the legs have a very much greater span width than the known telescopic supports. Thus the excavator in accordance with the invention can also be set up under unfavourable conditions in cemeteries without damaging the adjacent graves.

As transport vehicle, low three-wheeled vehicles, so called all-purpose transporters, the motor construction and driver's seat are arranged in the region of the individual steerable wheel, whereas the two other wheels are located on a common axle and take the weight of the object to be transported, are suited to a particular extent as the transport vehicle. The basic frame is therefore appropriately so constructed that it fits on the vehicle frame of such a transporter and comes to rest approximately centrally over its axle. Guide forks or the like can facilitate the setting down. Furthermore a simple device for locking the basic excavator frame on the vehicle frame so that it does not slip during the movement is recommended.

As an appropriate device for locking the joints connecting the limbs of the individual legs it is proposed that there are provided, at the joint halves gear crowns, facing each other, and that the joint axis is constructed as a clamp bolt, which in the selected angle position, keeps teeth engaged with each other and thus causes a completely stiff or rigid, connection of the two limbs.

To guarantee an acceptable stability of the excavator, particularly in the case of a pivoting range of the arm of 360°, the application of four legs to the corners of a rectangular or square frame is proposed. Furthermore it is recommended that there are provided at the free ends of the legs, i.e. the outer limb, pivotably mounted support feet, which are constructed, e.g. discshaped and prevent the legs from sinking into the ground. The support feet should also give the legs the possibility of slipping a little horizontally on raising and lowering the basic frame.

It is further proposed as very advantageous in the practical operation of the excavator that the seat for the excavator driver is arranged next to the arm and is constructed to be removable. Preferably the seat should also be arranged on the turntable or the like so that it rotates with the arm. In this way, as compared with the known excavator equipment the excavator driver's view is not hindered by the arm. The seat should be removable, i.e. capable of being easily pulled out or suspendable, so that it does not stand out laterally over the entire width of the excavator in the mounted state.

In this connection reference is to be made to a characteristic feature of one form of the excavator in accordance with the invention, namely to the fact that it can have in the transport state a total width of only 89 cm. This has not yet been achieved hitherto with small comparable excavating equipment and also broadens the field of application to older and smaller cemetery plots where, hitherto, on account of the narrow paths, excavating equipment could not be used.

The construction of the articulated connection of the legs with the basic frame provides, that the joints with vertical axes are lockable by means of two gear crowns engaging in each other and that in each case the teeth of the gear crown fastened to the leg side joint half extend upwardly and the gears of the gear crown fastened to the basic frame extent downwardly. Whereas the gear crowns, which are constructed similarly to the joints between the limbs of the legs make possible, for each angle position, locking of the legs in an almost stepless manner, the cited arrangement of the gear crowns give a particularly operationally safe and fixed locking, since the gear crowns are pressed into each other by the dead load acting on the appropriate leg. In the case of the lateral supports of known excavator equipment, on the other hand, the locking of the pivotability about a vertical axis does not come into question, because the weight of the excavator rests, at least partially also on the fixed-braked wheels.

In the case of a preferred form of embodiment of the invention which is described in the following in greater detail, the joints with vertical axis can be loosened and locked with the help of an setting nut which is at the top and is therefore easily accessible. This constructional arrangement is of importance.

Figure 2:
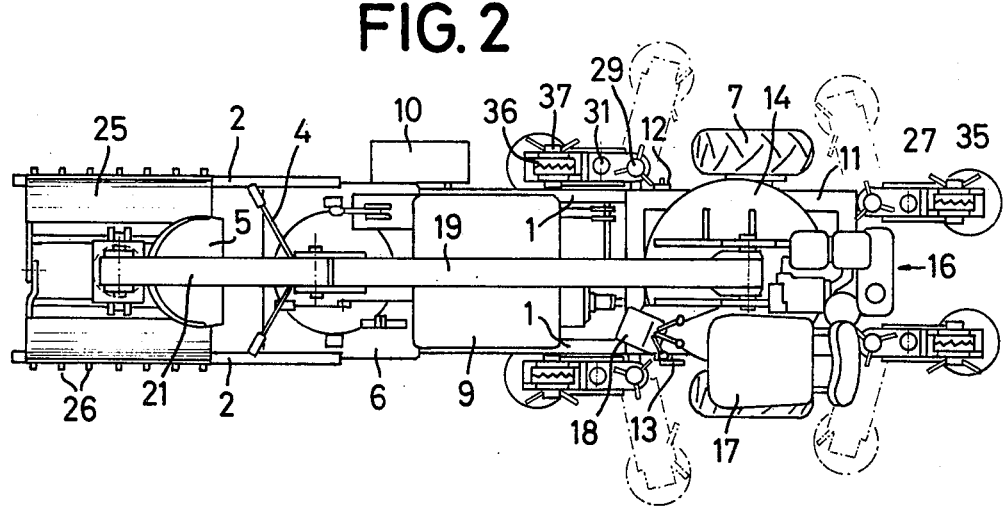
FIG. 2 shows a plan view of the loaded vehicle according to FIG. 1.

The cemetery excavator in accordance with the invention shown in FIGS. 1 and 2 is mounted on a three-wheeled multi-purpose transporter, known per se. The direction of movement is to the right. The transporter comprises two longitudinal beams 1, which are extended to the rear by two offset carrying rails 2 for a gripping device. A non-driven individual wheel 3 is steerable with the help of a tiller arrangement 4. Also the sprung driver's seat 5 and the operating elements for the drive motor (not given in any detail), the brakes, the gear change and so on are arranged over the individual wheel on a driver's platform 6. Two drive wheels 7 are located at the front end of the longitudinal beam 1. They are driven by means of a combined differential and reversing gear 8 which is located underneath the longitudinal beam. The vehicle motor is located approximately in the centre between the individual wheel and the drive axle and is covered by means of a plate 9. A battery box which is mounted on the side is given the reference numeral 10.

In the region to the right of the plate 9 are placed all the linkages, shafts or other connecting parts below the top of the longitudinal beam 1 so that, after the original construction of this known transporter with the load over the drive wheels, the most varied devices to be transported, such as troughs, plank beds and so on can be placed on the longitudinal beams.

The excavator in accordance with the invention comprises a rectangular basic frame 11 of U-profile strips. It is mortised with the front end of the longitudinal beam in a manner which is not shown in any detail and has two lateral guide flaps 12 which can be fastened to the basic frame by means of a manual slide bolt 13 in order to prevent any tipping over or lateral sliding of the excavator during transport.

A turntable 14 which carries the bearing block 15 for an arm and an engine device 16 is located on the basic frame. The engine device comprises a small diesel motor without battery and starter and a hydraulic pressure generator driven by the motor. Mounted on the side at the bearing block is an excavator driver's seat 17, which can be removed in a simple manner, and in front of which is located, at a comfortably accessible height, an operating device 18 for the different operating functions of the excavator.

The arm comprises a lifting arm 19, which is actuable by means of a lifting cylinder 20 and a pivoting arm 21 which is actuable by means of a pivoting cylinder 22. Mounted at the lower end of the pivoting arm is a grab by means of a hydraulically rotatable gripping device suspension 23, which is to be opened and closed by means of a cylinder 24 and the shovels of which are given the reference numeral 25 and the teeth of which are given the reference 26. The grab is opened and lies on the carrying rail 2, wherein the teeth 26 secure its against slipping. The driver's seat 5 located above the gripping device can on raising and lowering the gripping device be folded up forwardly in conjunction with the mounting up and dismounting of the excavator.

In the region of its four corners 11, four boxform joint pieces 27 are pivoted to the basic frame about vertical axes. The joint pieces 27 can be locked in any angular position within the pivoting range, amounting to a good 90°, by means of enmeshing gear crowns 28 and an adjusting nut 29 lying thereabove. (cf. the chain line representation of the parts in FIG. 2). An inner limb 30 and its associated actuating cylinder 31 is pivoted to each joint piece. The piston rod of the actuating cylinder is pivoted to any eye 32 of the inner limb 30. The inner limb is connected at its upper end, by means of a lockable joint 33, to an outer limb 34 at the lower end of which is pivotably mounted a foot plate 35. For locking the joint 33 similarly enmeshing gear crowns 36 are fastened to both joint parts, which are clamped together with the help of a joint pin constructed as a setting bolt and an setting nut 37. The setting nuts 37 are provided with three gripping dovetailings which project in a star-like manner similarly to setting nuts 29 for an easier manipulation.

The hydraulic conduits, which connect the pressure generator via the individual control values to the operating cylinders and comprise flexible hoses at the joint points, are shown. Also the turntable 14 is hydraulically driven and rotatable about a full 360°. To supply the actuating cylinder 31 of the legs, pressure lines pass through the turntable in such a manner that, independently of the position of the turntable and of all the elements fastened thereto, conduit connections between the operating device 18 and two connecting pipes (not visible) fastened to the basic frame 11 are maintained. The actuating cylinder 31 is connected via reversing valves and hoses to these connecting pipes.

FIGS. 3 to 6 are schematic insofar as the two illustrated legs are shown in a non-truncated side view in the interests of better visibility. The plan view shown in FIG. 7, and corresponding to FIG. 4, of the excavtor in the operating position gives the correct idea.

Figure 3:
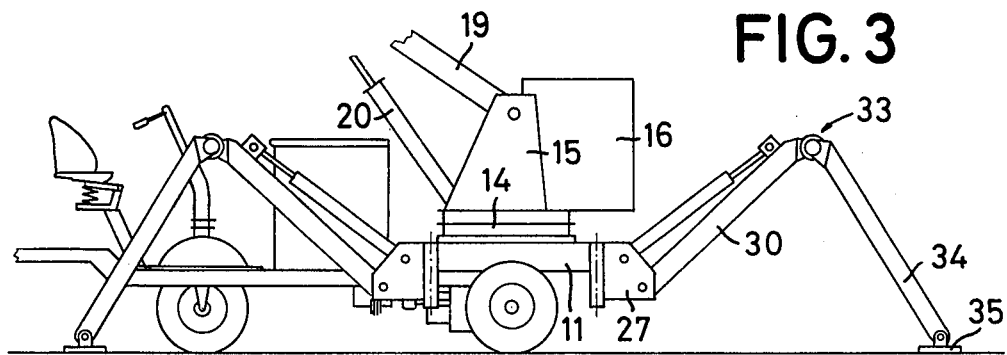
FIG. 3 to FIG. 6 show schematic side views of the excavator with different leg position reduced relative to FIG. 1.
Figure 4:
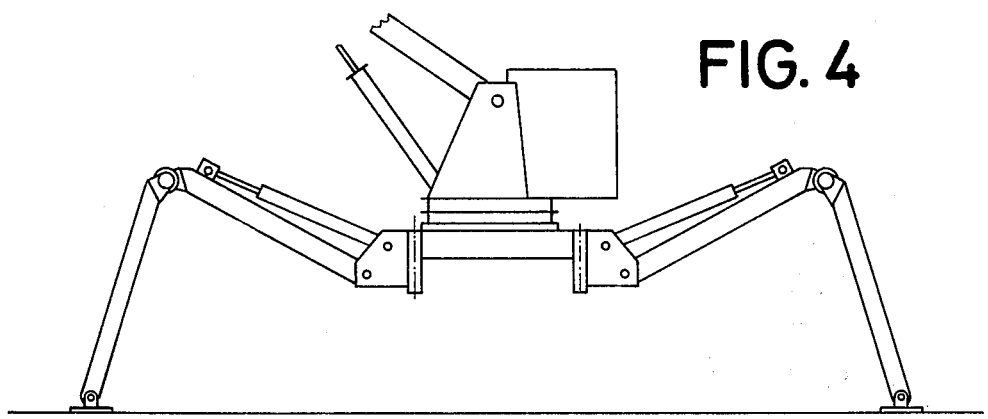

The excavator can be easily dismounted by one person and put into operation. FIG. 3 shows the first stage of this operation. If the vehicle has arrived at the work place, then the motor of the excavator is set into operation. Insofar as the adjusting nuts 37 are still not released, they must now be released so that the outer limb 34 of the legs are freely pivotable. Now the inner limbs are pivoted outwardly hydraulically according to their position, wherein simultaneously also the outer limbs are folded outwardly by hand. Also the setting bolts 29 of the vertical joints are at this point in time further released so that the foot plates 35 can be moved within an extraordinarily large horizontal area range in all directions and a suitable put down point even in the case of a densely occupied cemetery can be found with ease. The legs thus in no way have to have the same spacing and be pivoted out in such a regular angular position as FIG. 7 shows. Rather the angular position and span width of the legs can be extensively adapted to the local conditions.

Now if suitable set down points are found for all four legs, all the setting bolts 27 at the vertical joints and 37 at the horizontal joints of the legs are tightened. Thereupon all four actuating cylinders 31 are extended further which results in the basic frame 11 rising together with the excavator located thereon. It has thus taken up its operating position and its weight rests exclusively on the four legs. The transport vehicle can drive away and be used in other ways or for example be used for removing the excavated material. On raising the excavator the foot plates of necessity migrate slightly towards each other, which, however, has no disadvantageous affects. Moreover this horizontal movement of the leg ends can be kept very small if the excavator is raised only so far that the vehicle with its relatively lower wheels can move through thereunder.

The mounting when the digging operation has finished is effected in the reverse sequence. The guide pins and the guide flaps 12, already mentioned, facilitate homing into the correct position on the chassis. Finally the locks 13 are put on and the legs are folded up in accordance with FIGS. 1 and 2.

Figure 5:
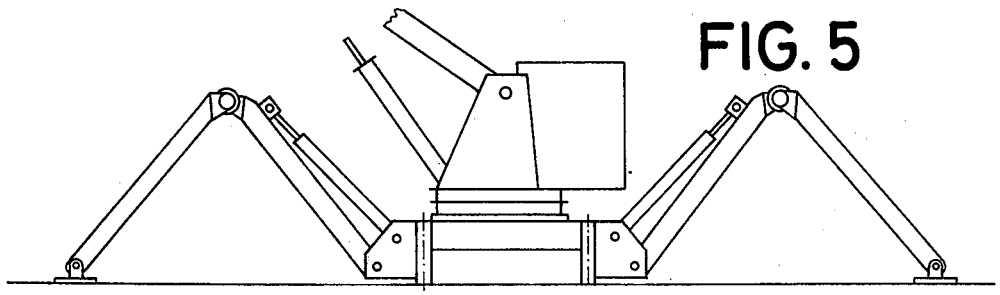
Figure 6:
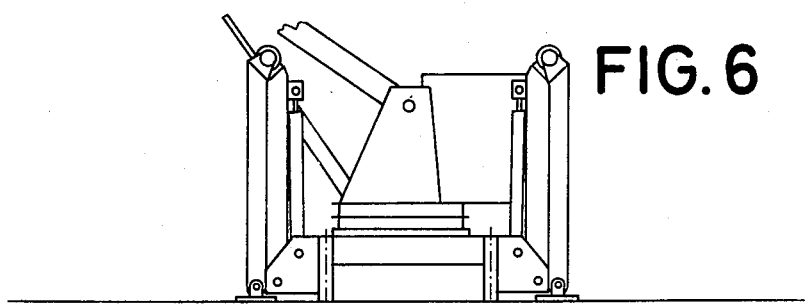

For the space saving storing of the excavator during the time in which the transport vehicle is used in other ways, the excavator can be set down in a store or the like or even put down onto the ground. In this case it is first raised into the operating position in accordance with FIG. 4. After the transport vehicle has driven away, however, it is then placed completely onto the ground, as is shown in FIG. 5. The weight of the frame now lies directly on the ground so that the "knee joints" 33 are released and the inner limbs 30 can be moved in their vertical position they take up when mounted on the transport vehicle, wherein the outer limbs 34 lie completely next to each other, as is shown in FIG. 6. Also the excavator takes up noticeably little space in this storage position.

FIG. 8 shows the connection of the legs to the basic frame 11 in detail. The joint piece 27 comprises two vertical parallel plates which are connected together above and below by two welded-on horizontal strips. These strips project over the right-hand side and form joint eyes 38 and 39 with coaxial with vertical axis. The inner limb 30 and the actuating cylinder 31 are pivotable about rotatable pins 40 and 41 between the plates of the joint piece. A bearing sleeve 43 which is flush with the carrying frame at the top and projects below, is welded to the carrying frame 11 via an intermediate piece 42. At the lower end of this bearing sleeve is welded a gear crown 28a, the teeth of which point downwardly. An identical gear crown 28b, the teeth of which point upwards to engage in the other gear crown, is welded to the lower end eye 39. The upper eye 39 projects at least so far over the upper end of the bearing sleeve that by a downward movement of the joint piece the gear crowns can come out of engagement. A bearing pin 44, the head 44a of which is located at the lower end, passes through the bearing sleeve, the eyes and the gear crowns. The setting nut 29, bolted onto the upper end of the bearing pin, has a tubular attachment 29a, which passes through the eye 38 and rests on the bearing sleeve 43.

In the position shown, the adjusting nut is turned tight. In this way the head of the bearing pin presses on the lower eye and the lower gear crown 28b so that the teeth are in engagement. However it is to be valued as a special advantage of the invention that the teeth also come into engagement and thus locking of the vertical joint of the legs occurs as soon as the excavator rests with its weight on the legs, even if the adjusting nut 29 is not tightened.

If the excavator is mounted, and thus the legs press with their weight downwards, then by loosening the adjusting nuts 29, the joint pieces can be moved away downwardly, wherein the gear crowns come out of engagement and the leg is rotatable about its vertical joint axis.

FIGS. 9 and 10 show the lockable joint between the limbs of the legs in detail. Here too, two gear crowns 36a and 36b are provided which are welded to two insert pieces 45 and 46. The square hollow profile of the two limbs 30 and 34 is each composed each of two U-profiles 47 or 48, as the included cross-section shows. The insert pieces can therefore be inserted in their appropriae limb and be firmly welded to one of the U profiles before the second U profile is welded on. The setting nut 37 bolted onto the joint bolt 49 clamp the two joint halves together and in so doing effect the locking. To release the locking, after the loosening of the adjusting nuts, the two joint halves are pulled apart a little by hand so that the gear crowns come out of engagement.

It will be understood that the above description of the present invention is susceptible to various modifications changes and adaptations.

What is claimed is:

1. An excavator comprising a basic frame, an independently operable excavating mechanism on said basic frame, at least three folding articulated legs on said basic frame for supporting said basic frame, each said folding articulated leg comprising a first limb, and a second limb, means interconnecting said first limb and said basic frame for pivoting said first limb in both vertical and horizontal directions, a lockable joint including clamp means with a horizontal axis connecting said first limb and said second limb, and rotatable means for rotating said independently operable excavating mechanism through 360°.

2. An excavator as defined in claim 1, wherein said seating means comprises means matching with a frame of a three wheeled transport vehicle with two driven wheels to support said basic frame over a common axis of said two driven wheels.

3. An excavator as defined in claim 1, wherein said limbs of said foldable legs comprise limbs of approximately equal length and said lockable joint comprises a joint allowing said first and second limb associated therewith each having a generally linear axis being in at least substantially parallel position respecting said linear axes.

4. An excavator as defined in claim 1, wherein said lockable joints each comprise a first half joint and a second half joint, a first gear crown on said first half joint, a second gear crown facing said first gear crown and provided on said second half joint, and a setting bolt forming the axis of said joint and for holding said gear crowns together in a selected angular relationship.

5. An excavator as defined in claim 1, and comprising four of said folding legs.

6. An excavator as defined in claim 1, and comprising support feet pivotally arranged on free ends of said folding legs.

7. An excavator as defined in claim 1, and comprising further an arm for operating said independently operable excavating mechanism and a removable seat for an operator adjacent to said arm.

8. An excavator as defined in claim 1, and comprising lockable joints with a vertical axis between said first limbs and said basic frame.

9. An excavator as defined in claim 8, wherein each said lockable joint with a vertical axis comprises a first gear crown mounted for movement with said first limb and with teeth extending upwardly and a second gear crown associated with said basic frame, with teeth extending downwardly and for meshing with said first gear crown.

10. An excavator as defined in claim 9, wherein each said lockable joint also comprises a bearing sleeve rigidly attached to said basic frame, first and second eye members associated with said first limb and at either end of said bearing sleeve with said first gear crown mounted on said second eye member and said second gear crown mounted on an associated end of said bearing sleeve, a cylindrical extension on said bearing sleeve extending through said first eye member, a bolt extending through said first and second eye members, said bearing sleeve, said cylindrical extension and said first and second gear crowns, a head element on one end of said bolt and a nut element on the other end of said bolt with one of said elements engaging said cylindrical extension.

11. An excavator comprising a basic frame, an independently operable excavating mechanism on said basic frame, at least three folding articulated legs on said basic frame for supporting said basic frame, each said folding articulated leg comprising a first limb, and a second limb, means interconnecting said first limb and said basic frame for pivoting said first limb in both vertical and horizontal directions, a lockable joint including clamp means with a horizontal axis connecting said first limb and said second limb, said lockable joints each comprising first half joint and a second half joint, a first gear crown on said first half joint, a second gear crown facing said first gear crown and provided on said second half joint, and a setting bolt forming the axis of said joint and for holding said gear crowns together in a selected angular relationship.

12. An excavator as defined in claim 11, wherein said seating means comprises means matching with a frame of a three wheeled transport vehicle with two driven wheels to support said basic frame over a common axis of said two driven wheels.

13. An excavator as defined in claim 11, wherein said limbs of said foldable legs comprise limbs of approximately equal length and said lockable joint comprises a joint allowing said first and second limb associated therewith each having a generally linear axis being in an at least substantially parallel position respecting said linear axes.

14. An excavator as defined in claim 11, and comprising four of said folding legs.

15. An excavator as defined in claim 11, and comprising support feet pivotally arranged on free ends of said folding legs.

16. An excavator as defined in claim 11 and comprising rotatable means for rotating said independently operable excavating mechanism through 360°.

17. An excavator as defined in claim 11, and comprising further an arm for operating said independently operable excavating mechanism and a removable seat for an operator adjacent said arm.

18. An excavator as defined in claim 11, and comprising locable joints with a vertical axis between said first limbs and said basic frame.

19. An excavator as defined in claim 18, wherein each said lockable joint with a vertical axis comprises a first gear crown mounted for movement with said first limb and with teeth extending upwardly and a second gear crown associated with said basic frame, with teeth extending downwardly and for meshing with said first gear crown.

20. An excavator as defined in claim 1, wherein each said lockable joint also comprises a bearing sleeve rigidly attached to said basic frame, first and second eye members associated with said first limb and at either end of said bearing sleeve with said first gear crown mounted on said second eye member and said second gear crown mounted on an associated end of said bearing sleeve, a cylindrical extension on said bearing sleeve extending through said first eye member, a bolt extending through said first and second eye members, said bearing sleeve, said cylindrical extension and said first and second gear crowns, a head element on one end of said bolt and a nut element on the other end of said bolt with one of said elements engaging said cylindrical extension.

* * * * *